H. NEUMAN.
TUBE CUTTING MACHINE.
APPLICATION FILED MAR. 20, 1914.
1,269,635.
Patented June 18, 1918.
3 SHEETS—SHEET 2.
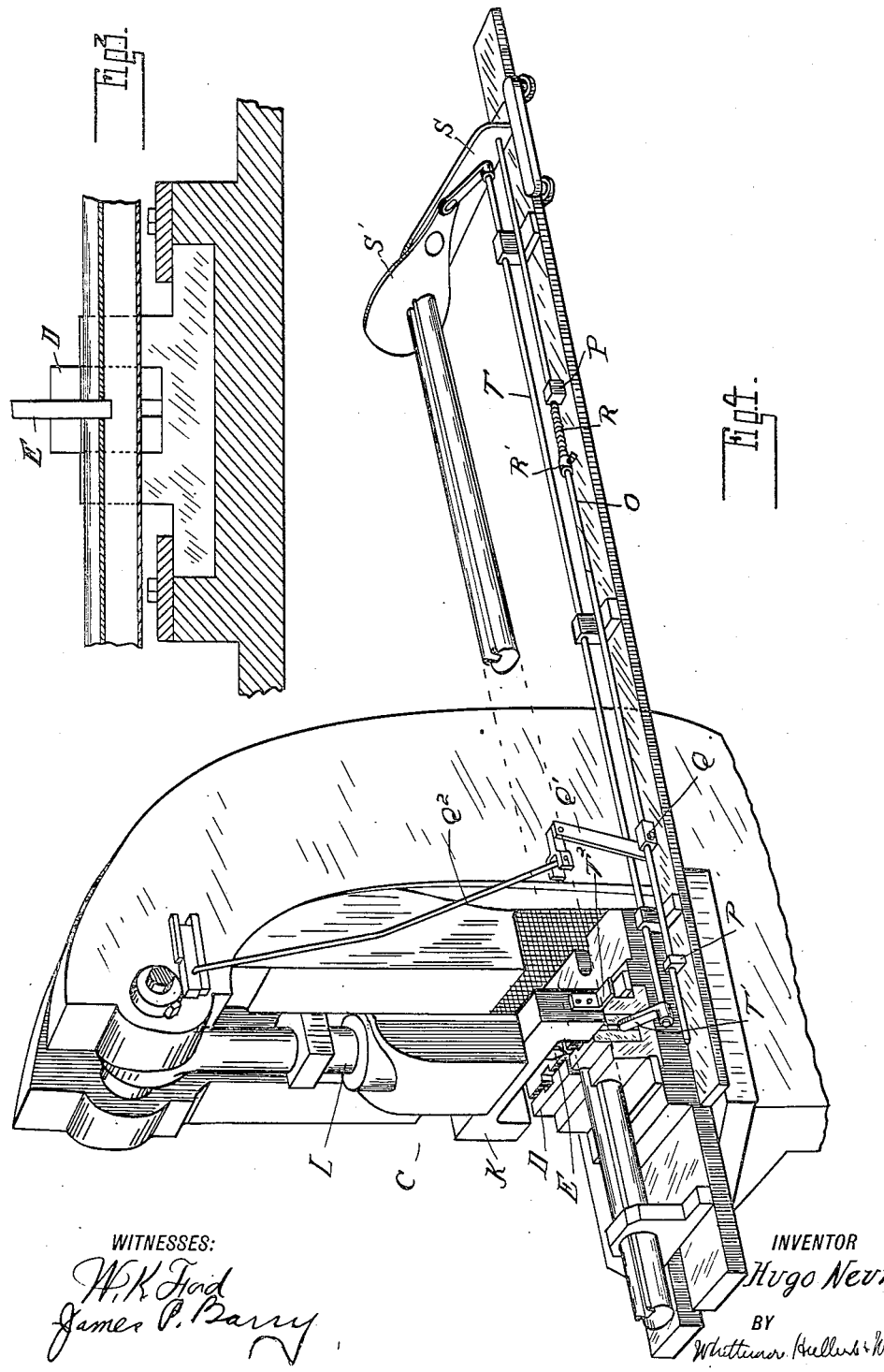

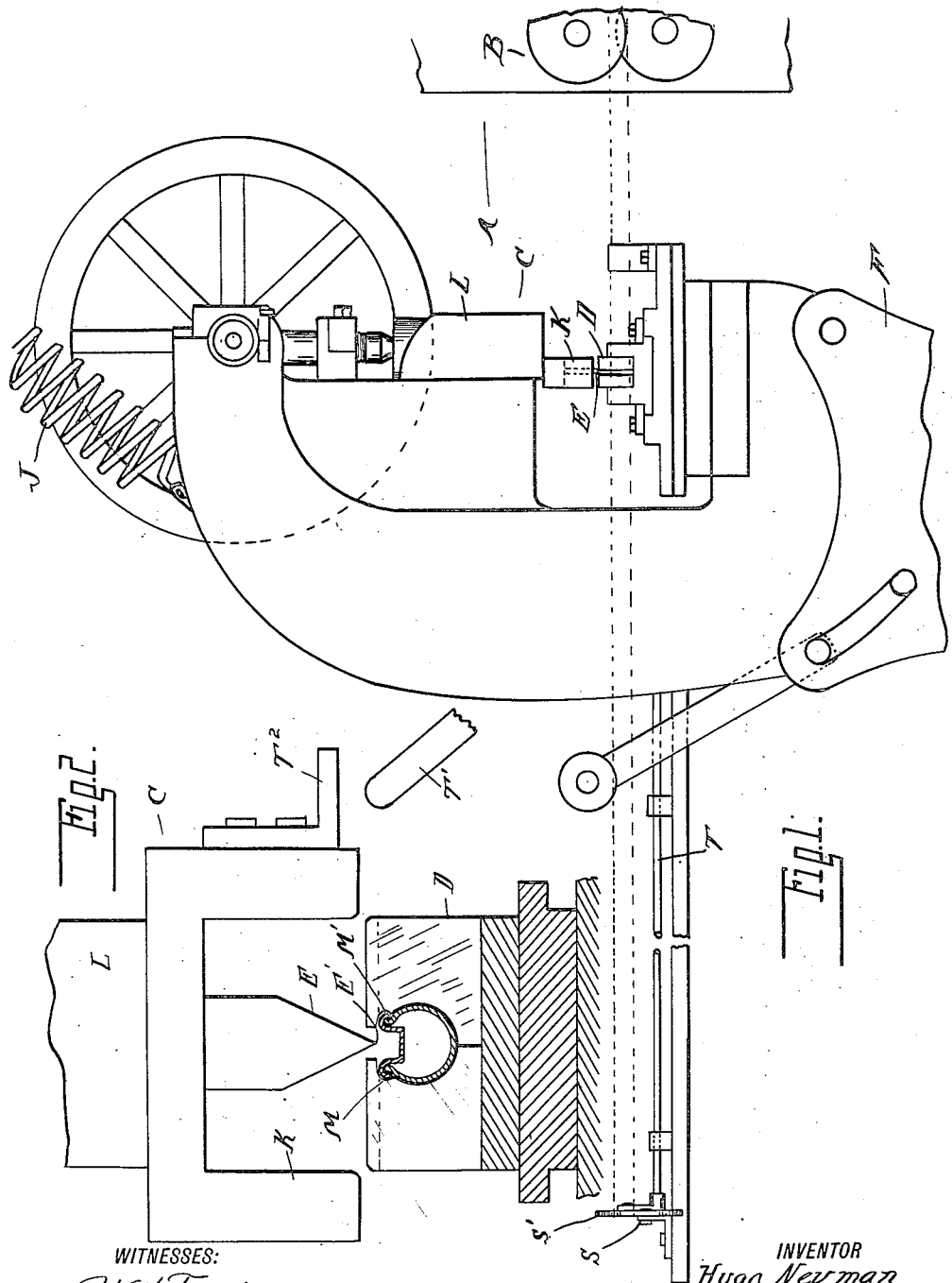

H. NEUMAN.
TUBE CUTTING MACHINE.
APPLICATION FILED MAR. 20, 1914.
1,269,635.
Patented June 18, 1918.
3 SHEETS—SHEET 3.
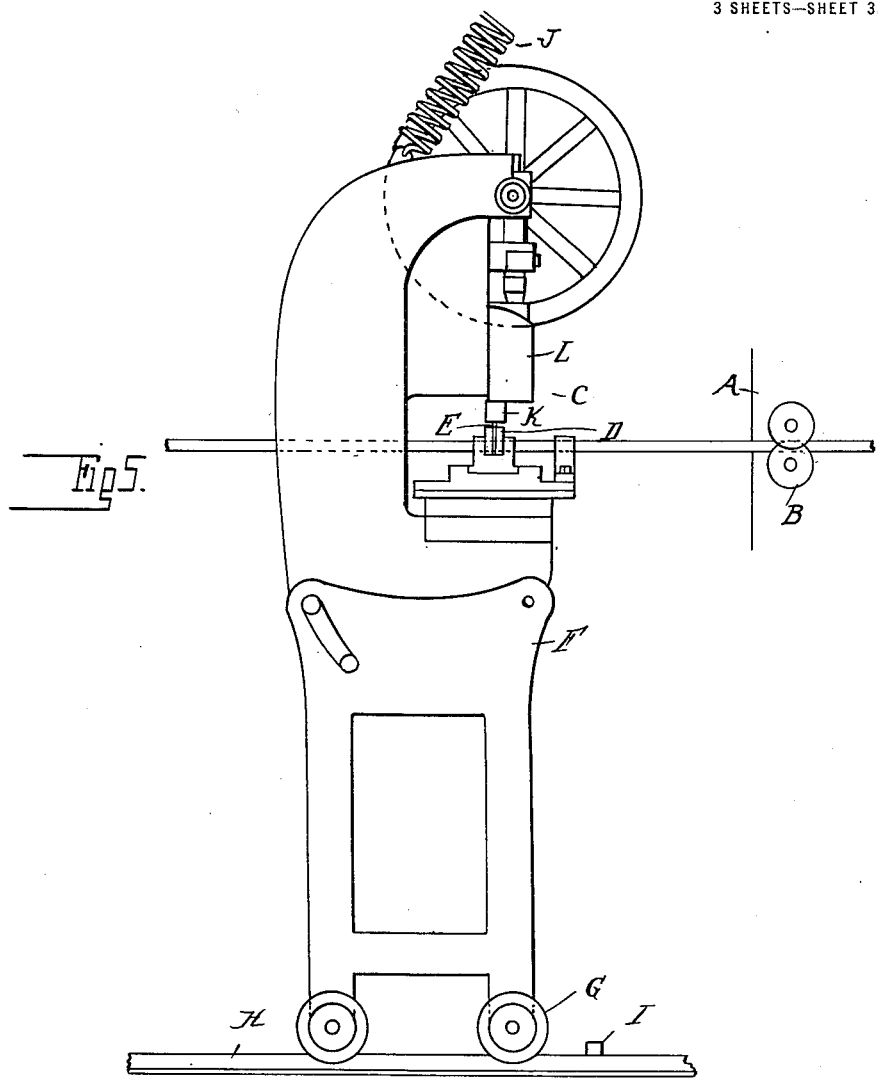
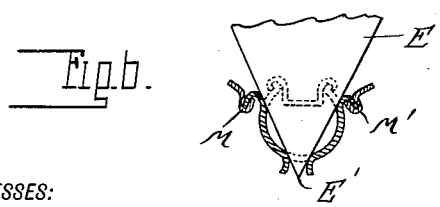
WITNESSES:
INVENTOR
Hugo Neuman
BY
ATTORNEYS

UNITED STATES PATENT OFFICE.

HUGO NEUMAN, OF FORD CITY, ONTARIO, CANADA, ASSIGNOR TO DIAMOND MANUFACTURING COMPANY, OF DETROIT, MICHIGAN, A CORPORATION OF MICHIGAN.

TUBE-CUTTING MACHINE.

1,269,635.     Specification of Letters Patent.     Patented June 18, 1918.

Application filed March 20, 1914. Serial No. 825,989.

*To all whom it may concern:*

Be it known that I, HUGO NEUMAN, a citizen of the United States of America, residing at Ford City, in the Province of Ontario and Dominion of Canada, have invented certain new and useful Improvements in Tube-Cutting Mechines, of which the following is a specification, reference being had therein to the accompanying drawings.

The invention relates to machines for cutting off metallic tubes in predetermined lengths, and it is the object of the invention to obtain a construction which is operable in connection with a machine for continuously forming the tubes and without interruption in the continuous feed thereof. It is a further object to sever the tubes without burring or marring the ends of the sections.

In the drawings:

Figure 1 is a side elevation of the machine;

Fig. 2 is a cross section through the severing and holding dies;

Fig. 3 is a longitudinal section thereof;

Fig. 4 is a perspective view showing the gage and trip mechanism;

Fig. 5 is an elevation of the movable severing press; and

Fig. 6 is a fragmentary sectional view showing the shearing blade in operation.

A is a machine for the continuous formation of tubes, which may be of any suitable construction, forming no part of the present invention. B are the delivery rolls of the machine A through which the finished tube is fed continuously. C is a punching press arranged in alinement with the machine A, and provided with split dies D for embracing the section of the tube and conforming to the contour thereof. The dies D are formed in pairs which are spaced slightly from each other, and between these pairs a shearing-blade E is insertible to sever the tube.

Inasmuch as the tube when delivered from the rolls B is moving continuously, it is necessary that the dies and shearing-blade should travel at the same rate of speed during the shearing operation. This is accomplished by mounting the press C upon a traveling carriage, and by clamping the dies to the tube in advance of and during the shearing operation, so as to cause all of the parts to move together. As shown, the press C has standards F provided with rolls G at their lower ends, which engage a suitable track H extending parallel to the path of the tube. The press is held in normal position by a suitable stop I, being drawn thereagainst by the tension of a spring J, which also operates to partially counterbalance and relieve the weight. The dies D are clamped against the tube by the engagement therewith of a yoke-shaped member K, which is carried by the plunger L of the press, as shown in Fig. 2. Thus, when the yoke engages with the dies they are forced together with sufficient pressure to frictionally clamp the tube, so that the continued forward movement of the latter will be imparted to the press C, causing it to travel forward during the shearing operation, while after the withdrawal of the plunger L and disengagement of the yoke K the dies D will be relieved, permitting the spring J to return the press to its normal position.

To avoid burning the ends of the severed sections of the tube, the shearing blade is so constructed as to exert an outward pressure upon the metal. This is accomplished by making the blade of diamond or acute angular shape, the lower edge E' being sharp and adapted to penetrate the metal at the top of the tube. The thickness of the blade E is just equal to the space between the dies D, and consequently after the penetration of the metal and in the further downward movement, a section equal to the width of the die will be sheared from the tube by an outward movement. As shown in Fig. 2, the specific form of tube which is engaged with the dies is one having a channeled groove therein, with beads or flanges upon opposite sides thereof. With this specific construction the blade E first severs the bottom of the channel portion, forcing the metal outward until the beads M and M' are severed, the action continuing until the point E' penetrates the bottom of the tube, after which the sections upon opposite sides of the center are sheared off outwardly in opposite directions. When the operation is completed the ends of the severed sections are still retained in the dies D, but upon the withdrawal of the plunger and disengagement of the yoke K from the dies, the pressure of the latter on the tube is released, as previously stated.

For determining the length of the severed section, a gage is provided, which is adjustably positioned in rear of the press C and is adapted when engaged by the end of the tube to trip the press-operating mechanism. Specifically, this gage comprises a rod O slidably engaging bearings P, and having an adjustable sleeve Q connected to a lever Q' for actuating the trip-rod Q² of the press. A spring R upon the rod O, engaging an adjustable collar R', serves to yieldably hold the rod in normal position but permits of movement of the rod to actuate the trip. At the outer end of the rod O is a stop-arm S having a pivoted extension S' which extends into the path of the tube so as to be actuated by the forward movement thereof and to carry with it the stop S and rod O. T is a rock-shaft operatively connected to the pivotal extension S' and carrying at its opposite end an actuating rock-arm T', which extends in the path of a finger T² on the press, the arrangement being such that when the plunger of the press descends the finger T² will rock the shaft T, which in turn will rock the extension S' out of engagement with the end of the tube, thereby permitting the further movement of said tube for disengagement from the press.

With the construction just described, the length of tube may be determined by an adjustment of the rod O, the collar R' and sleeve Q being first loosened. These parts are then secured to the rod, and the actuating rock-arm T' is also adjusted to be in operative relation to the finger T². Thus when the end of the tube strikes the pivotal extension S', it will carry both rods O and T forward, tripping the press and causing the yoke K in descending to actuate the dies D, so as to clamp the tube and cause the forward traveling of the press, as before described. During this movement the shearing-blade will descend, penetrating the tube and shearing as described, and at the same time the finger T² will actuate the rod T to rock the extension S' out of the path of the end of the tube. In the upward or return stroke of the press plunger the dies D will be unclamped, permitting the spring J to return the press to its normal position and also permitting the outward feeding of the severed section of the tube under the actuation of the following portion of the tube. As soon as the severed section is disengaged, the pivotal latch S', will fall into the path of the out-feeding tube and the operation will be repeated.

What I claim as my invention is:—

1. The combination with means for continuously feeding a tube, of a movable shearing press therefor, clamping dies for said tube upon said press, and means actuated upon the tripping of said press for closing said clamping dies to couple the same and the press with said tube during the shearing operation.

2. The combination with means for continuously feeding a tube, of a shearing-press for severing said tube capable of reciprocatory movement parallel to said tube, clamping dies for said tube upon said press, and means actuated by the tripping of the press for closing said clamping dies to couple the same and the press with said tube during the shearing operation.

3. The combination with means for continuously feeding a tube, of a shearing-press for said tube, a traveling gage for said press movable parallel to said tube, dies mounted on said press for embracing said tube adjacent to the shearing-blade, and means operating upon the tripping of the press for clamping said dies to couple the tube and press during the shearing operation.

4. The combination with means for continuously feeding a tube, of a shearing press, split dies mounted on said press embracing said tube and transversely slotted to receive the shearing-blade, a carriage on which said press is mounted, and means operating upon the tripping of the press for clamping said split dies to cause said press to travel with the tube during the shearing operation.

5. The combination with a shearing-blade having a piercing point, of a split die for surrounding a tube, transversely slotted for the passage of said blade, and a yoke movable with said piercing blade for embracing said split die to clamp the same in advance of the piercing and shearing action of said blade.

6. The combination with means for continuously feeding a tube, of a shearing-press movable parallel to said tube, split dies mounted on said press for embracing said tube, a shearing-blade for severing the tube adjacent to said dies, a gage extending into the path of the end of said tube, tripping mechanism for the press actuated by the movement of said gage by the end of said tube, and means operating upon the tripping of said press for clamping said split dies to said tube and moving said press and gage therewith.

7. The combination with means for feeding a tube, of means for shearing the tube, a gage extending in rear of said shearing means into the path of said tube, a trip actuated by the movement of said gage under the propulsion of the end of said tube, for causing the operation of said shearing means, and means operated by said shearing means for disengaging said gage from the tube.

8. The combination with means for feeding a tube, of a shearing-press movable with said tube, dies mounted on said press for embracing said tube, a gage extending in rear of said press into the path of said tube, means operated by movement of said gage under the propulsion of the end of said tube for tripping said shearing-press, means operating upon the tripping of said press for first clamping said dies to said tube to cause the movement of the press with said tube and for then shearing the tube, and means automatically operated by said shearing means for disengaging said gage from said tube to permit the further feeding and removal thereof.

9. The combination with means for feeding a tube, of a movable shearing-press therefor, means for tripping the press, clamping dies for said tube, and means automatically actuated upon the tripping of said press for closing said clamping dies to couple the same and the press with said tube during the shearing operation.

10. The combination with means for continuously feeding the tube, of a movable shearing-press therefor, clamping dies for said tube upon said press, and means for closing said clamping dies to automatically couple the same and the press with said tube during the shearing operation.

11. The combination with means for feeding the tube, of a movable shearing-press therefor, clamping dies for said tube, means for tripping the press, and means automatically actuated thereby for closing the clamping dies.

In testimony whereof I affix my signature in presence of two witnesses.

HUGO NEUMAN.

Witnesses:
WM. J. BELKNAP,
JAMES P. BARRY.